(12) United States Patent
Song

(10) Patent No.: US 7,972,192 B2
(45) Date of Patent: Jul. 5, 2011

(54) CURING DEVICE AND MANUFACTURING METHOD FOR LIQUID CRYSTAL DISPLAY

(75) Inventor: Sung Hun Song, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 12/701,674

(22) Filed: Feb. 8, 2010

(65) Prior Publication Data

US 2010/0216365 A1    Aug. 26, 2010

(30) Foreign Application Priority Data

Feb. 20, 2009   (CN) .......................... 2009 1 0078207

(51) Int. Cl.
  *H01J 9/00*   (2006.01)
  *H01J 9/24*   (2006.01)
(52) U.S. Cl. ................ 445/62; 445/66; 445/72; 445/73; 445/6
(58) Field of Classification Search ................... 445/62, 445/66, 72, 73, 6
See application file for complete search history.

(56) References Cited

FOREIGN PATENT DOCUMENTS

CN   1485663 A    3/2004
JP   2004-294892 A   10/2004

*Primary Examiner* — Joseph L Williams
(74) *Attorney, Agent, or Firm* — Ladas & Parry LLP

(57) ABSTRACT

A curing device comprises a reaction chamber, a workbench provided at a bottom of the reaction chamber, an ultraviolet lamp provided at the top of the reaction chamber for irradiating the workbench, and a light shielding plate provided under the ultraviolet lamp for shielding the second area of the workbench from the light of the ultraviolet lamp. The workbench comprises a first area and a second area surrounded by the first area, the first area corresponds to a non-display area of a display panel to be produced, and the second area corresponds to the display area of the display panel to be produced. The workbench comprises a heating device.

17 Claims, 6 Drawing Sheets

CURING DEVICE AND MANUFACTURING METHOD FOR LIQUID CRYSTAL DISPLAY

BACKGROUND

This invention relates to a curing device and a manufacturing method for a liquid crystal display using such a curing device.

Liquid crystal display (LCD) is one main kind of Flat Panel Display (FPD).

Based on the orientation of the electrical field for driving liquid crystal, LCDs can be of a vertical-oriented electrical field type and a horizontal-oriented electrical field type LCDs. The vertical-oriented electrical field type LCDs comprise twist nematic (TN) type LCDs, and the horizontal-oriented electrical field type LCDs comprise fringe field switching (FFS) type LCDs and in-plane switching (IPS) type LCDs.

FIG. 1 shows a conventional manufacturing method of a LCD panel. FIG. 2 is a schematic view of a conventional ultraviolet curing process. As shown in FIGS. 1 and 2, liquid crystal materials are dropped on a color filter film, and an adhesive material is coated on an array substrate.

The conventional manufacturing method of the LCD panel comprises the following steps.

Step 101, dropping liquid crystal materials onto a prepared color filter substrate.

Step 102, coating an adhesive material on a prepared array substrate. The adhesive material contains a component that reacts with ultraviolet ray and/or a component that reacts with heat energy. That is, the component that reacts with ultraviolet ray is usually cured mainly upon applying ultraviolet ray, while the component that reacts with heat energy is usually cured mainly upon applying heat.

Step 103, assembling the color filter substrate and the array substrate together in a vacuum anneal chamber to form a panel.

Step 104, executing a preliminary curing of the adhesive material by ultraviolet ray (UV ray) to keep the gap between the color filter substrate and the array substrate. In general, the adhesive material can at the same time comprise two main kinds of components, i.e., the component that reacts with UV ray and the component that reacts with heat energy. Specifically, the preliminary curing includes the following steps: disposing the assembled panel on the workbench 11 within the UV curing device, shielding the display area of the panel with a light shielding plate, irradiating UV ray on the panel to cure the adhesive material 23 between the color filter substrate 21 and the array substrate 22, that is, to cure the component that reacts with the UV ray.

Step 105, curing the remnant adhesive material by heat treatment, that is, curing the component that reacts with heat energy to finish the adhesive material curing process. In the heat treatment, the liquid crystal materials is converted from a crystal state into a liquid state with the rising of the temperature and restores from the liquid state into a crystal state with the descending of the temperature, so that the molecules of the liquid crystal materials can be realigned and kept stable in a crystal state.

Step 106, after finishing the adhesive material curing process, cutting the panel to form LCD panels.

In the above method, after the array substrate and the color filter substrate are assembled together in the vacuum anneal chamber for curing, the adhesive material is cured upon applying the UV ray and then is treated in the heat treatment. In this step, a stock room is needed for storing the assembled panel. Usually, it takes one to two hours to conduct the heat treatment under a constant temperature of about 100° C. The heat supply is usually conducted in a non-contact manner, e.g., by infrared ray (IR) heating or the like.

Compared with the heat treatment, the UV curing process takes only several minutes. Thus a large-sized stock room is needed for storing the panel after being UV cured. The larger the size of the LCD becomes, the larger the space in the stock room needed becomes, increasing cost.

SUMMARY

An embodiment of the invention provides a curing device comprises a reaction chamber, a workbench provided at a bottom of the reaction chamber, an ultraviolet lamp provided at the top of the reaction chamber for irradiating the workbench, and a light shielding plate provided under the ultraviolet lamp for shielding the second area of the workbench from the light of the ultraviolet lamp. The workbench comprises a first area and a second area surrounded by the first area, the first area corresponds to a non-display area of a display panel to be produced, and the second area corresponds to the display area of the display panel to be produced. The workbench comprises a heating device.

Another embodiment of the invention provides a method of manufacturing a liquid crystal display panel using the curing device as described above. The method comprises steps of dropping liquid crystal materials on a plurality of panel areas of a color filter substrate, coating an adhesive material in a plurality of panel areas of an array substrate, assembling the color filter substrata and the array substrate together in a vacuum curing chamber to form an assembled panel, curing the adhesive material and heating the liquid crystal materials by the curing device, and cutting the assembled panel to form a plurality of liquid crystal display panels.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

First Embodiment of Curing Device

Figure 1:
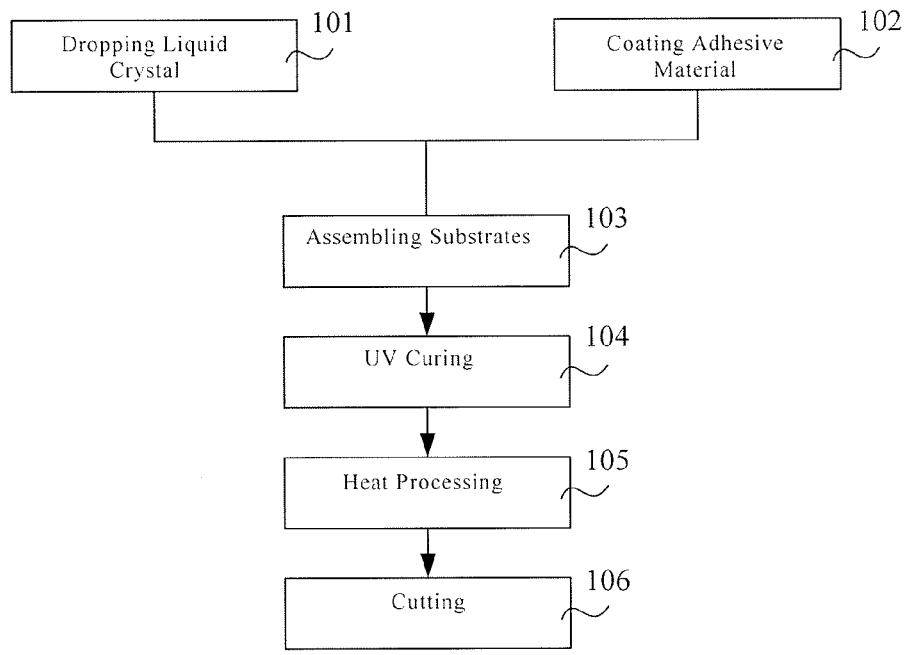
FIG. 1 shows a conventional manufacturing method of a liquid crystal display panel.
Figure 2:
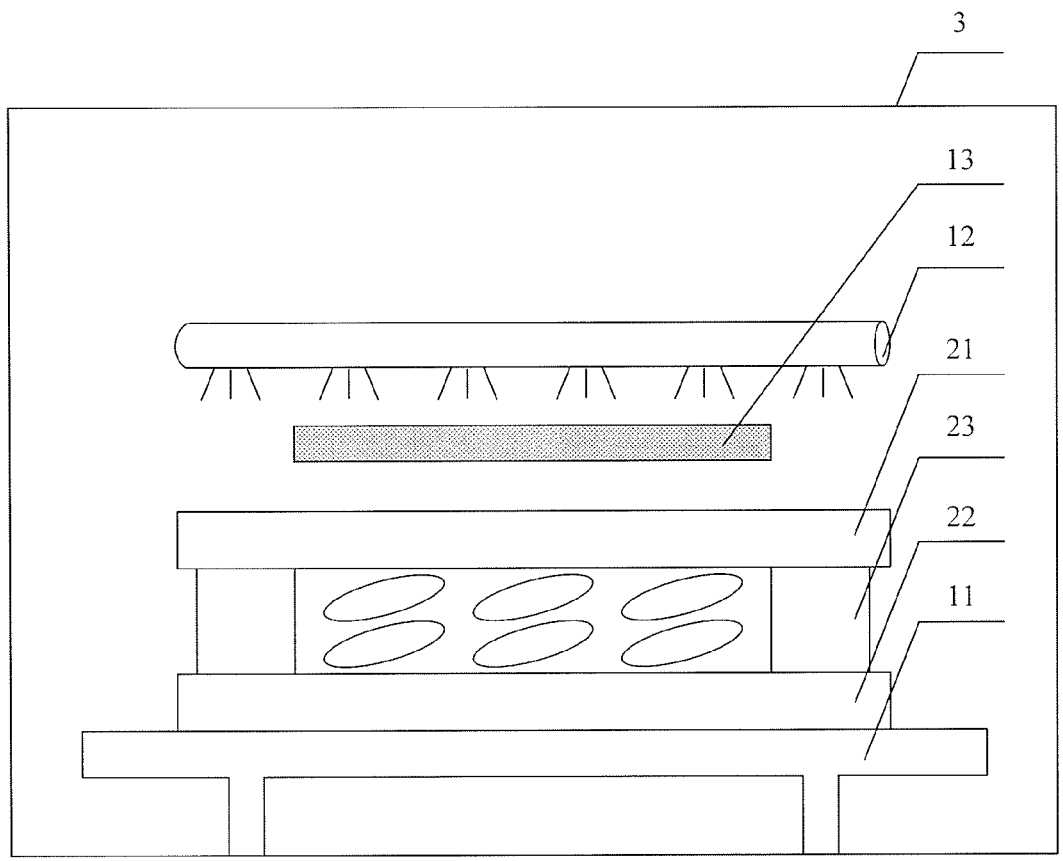
FIG. 2 is a schematic view of a conventional curing device.
Figure 3:
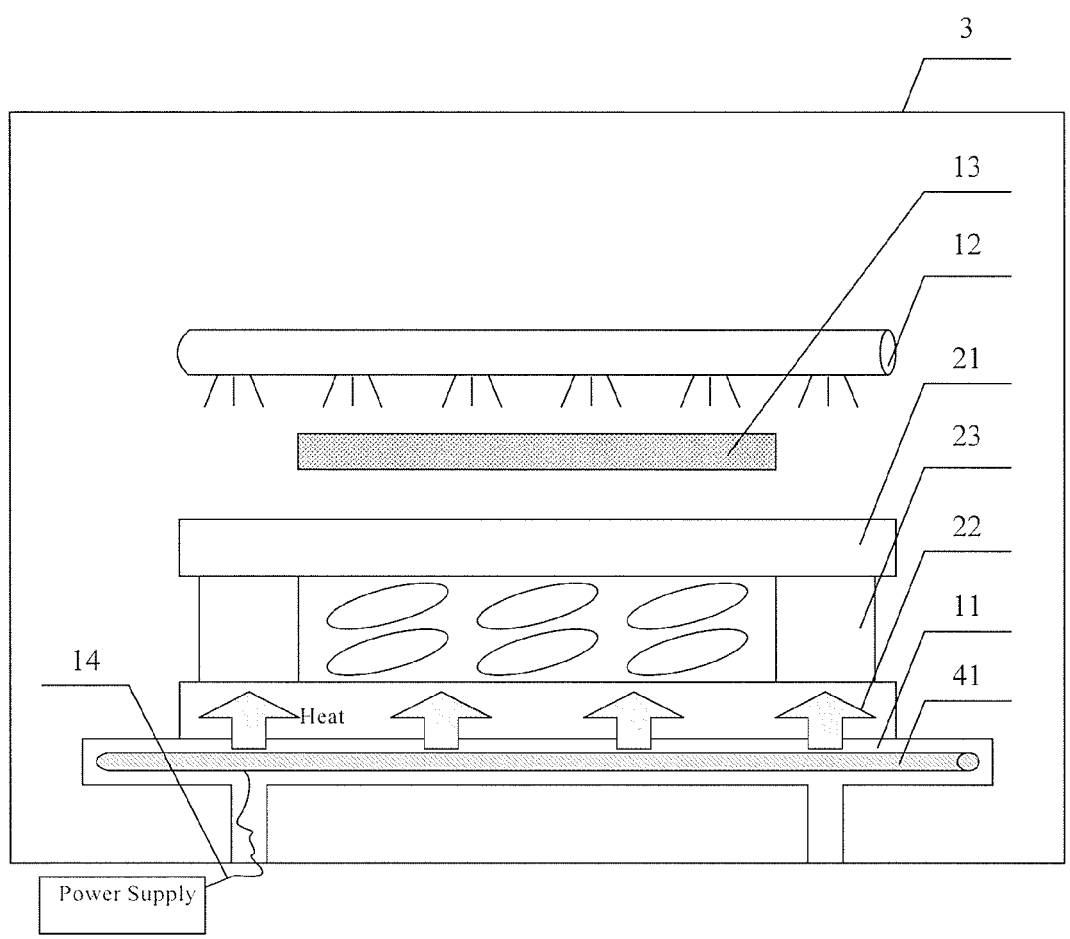
FIG. 3 is a schematic view of a curing device of a first embodiment of the present invention.

FIG. 3 is a schematic view of a curing device of the first embodiment of the present invention. As shown in FIG. 3, the curing device in this embodiment comprises the following parts.

A workbench 11 is provided for disposing a panel to be processed thereon and is located at the bottom of a reaction chamber 3. The workbench 11 is provided with a first area and a second area surrounded by the first area. The first area corresponds to the non-display area of the display panel to be produced, that is, the first area corresponds to the area where the adhesive material in the display panel to be produced is applied; the second area corresponds to the display area of the display panel to be produced. The workbench 11 is further provided with a heating device.

An UV lamp 12 is provided for vertically irradiating the whole workbench 11 and is disposed at the top of the reaction chamber 3.

A light shielding plate 13 is provided for shielding the second area of the workbench 11 from the light from the UV lamp 12. That is, the light shielding plate 13 shields the display area of the display panel to be produced and is disposed under the UV lamp 12.

In the curing device of this embodiment, the workbench 11 comprises a heating device, thus it is possible that the adhesive material of the panel under processing can be heat-treated at the time when the adhesive material is cured under the UV ray, so that the adhesive material is cured in the same device and also the realignment of the liquid crystal materials can be realized. In this way, the stock room for storing the panel having been subject to UV curing can be omitted, and in turn the problem that the panels may be scraped and damaged during transferring the panel into and out the stock room can also be avoided. The curing device in the present embodiment enhances the manufacturing efficiency and improves the quality of the finished LCD.

In this embodiment, the heating device may a conductive heating tube 41 provided within the workbench and is in electrical connection with a power supply via a wire. The power supply may be disposed within or out of the reaction chamber. It is preferred that the UV lamp 12 and the conductive heating tube 41 uses one power supply in common.

Second Embodiment of Curing Device

Figure 4:
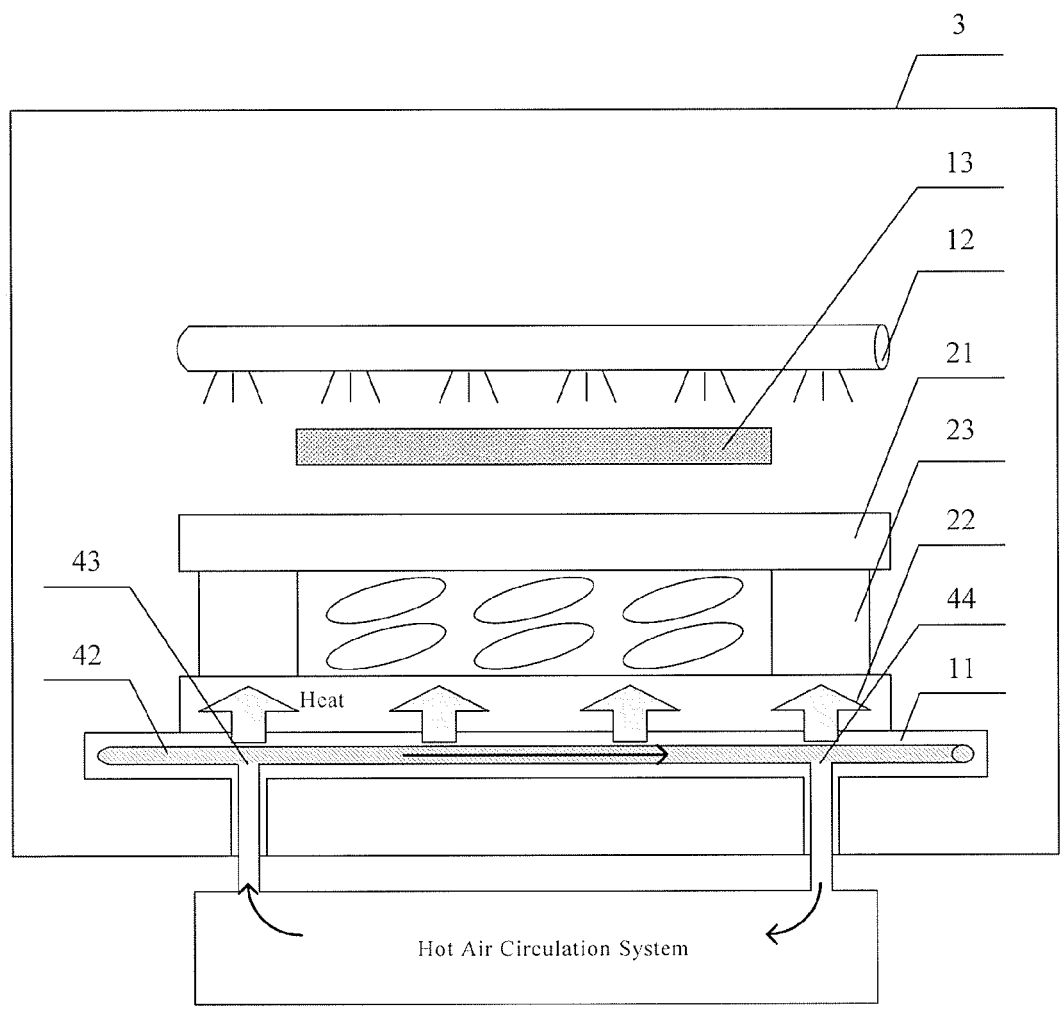
FIG. 4 is a schematic view of a curing device of a second embodiment of the present invention.

FIG. 4 is a schematic view of a curing device of the second embodiment of the present invention. As shown in FIG. 4, the curing device in this embodiment comprises the following parts.

A workbench 11 is provided for disposing a panel to be processed thereon and is located at the bottom of the reaction chamber 3. The workbench 11 is provided with a first area and a second area surrounded by the first area. The first area corresponds to the non-display area of the display panel to be produced, that is, the first area corresponds to the area where the adhesive material in the display panel to be produced is applied; the second area corresponds to the display area of the display panel to be produced. The workbench 11 is further provided with a vent line 42, and the vent line 42 has an air blowing hole 43 for blowing hot air into the vent line 42 and an air outlet hole 44 for exhausting the hot air in the vent line and is connected with the hot air circulation system via the air blowing hole 43 and the air outlet hole 44.

An UV lamp 12 is provided for vertically irradiating the whole workbench 11 and is disposed at the top of the reaction chamber 3.

A light shielding plate 13 is provided for shielding the second area of the workbench 11 from the light from the UV lamp 12. That is, the light shielding plate 13 shields the display area of the display panel and is disposed under the UV lamp 12.

In this embodiment, the heat is transferred from the vent line to heat the panel disposed on the workbench.

Third Embodiment of Curing Device

Figure 5:
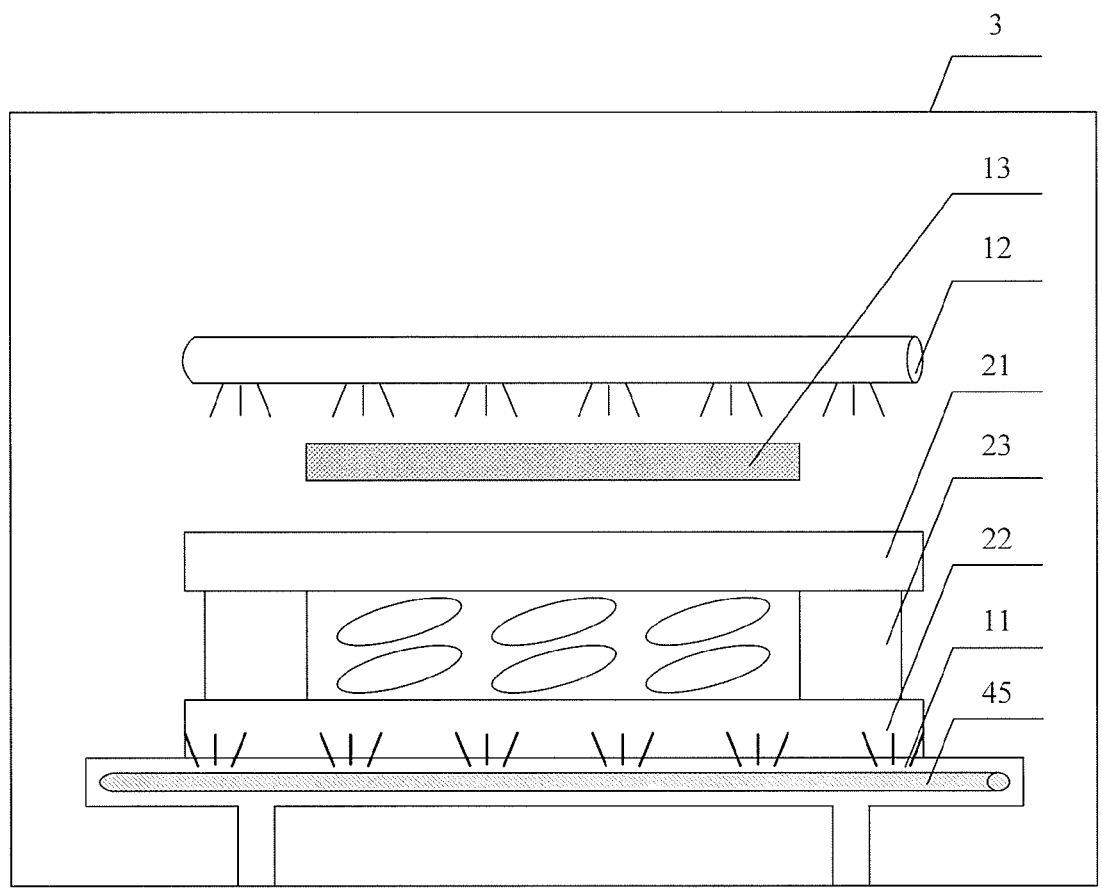
FIG. 5 is a schematic view of a curing device of a third embodiment of the present invention.

FIG. 5 is a schematic view of a curing device of the third embodiment of the present invention. As shown in FIG. 5, the curing device in this embodiment comprises the following parts.

A workbench 11 is provided for disposing a panel to be processed thereon and is located at the bottom of the reaction chamber 3. The workbench 11 is provided with a first area and a second area surrounded by the first area. The first area corresponds to the non-display area of the display panel to be produced, that is, the first area corresponds to the area where the adhesive material in the display panel to be produced is applied; the second area corresponds to the display area of the display panel to be produced. The workbench 11 is a transparent workbench, such as a quartz substrate or a glass substrate, under which an infrared lamp 45 is disposed to uniformly irradiate the panel to be produced.

An UV lamp 12 is provided for vertically irradiating the whole workbench 11 and is disposed at the top of the reaction chamber 3.

A light shielding plate 13 is provided for shielding the second area of the workbench 11 from the light from the UV lamp 12. That is, the light shielding plate 13 shields the display area of the display panel and is disposed under the UV lamp 12.

In this embodiment, the heat is transferred to the panel disposed on the workbench by applying infrared ray, that is, in a non-contact manner.

Fourth Embodiment of Curing Device

Figure 6:
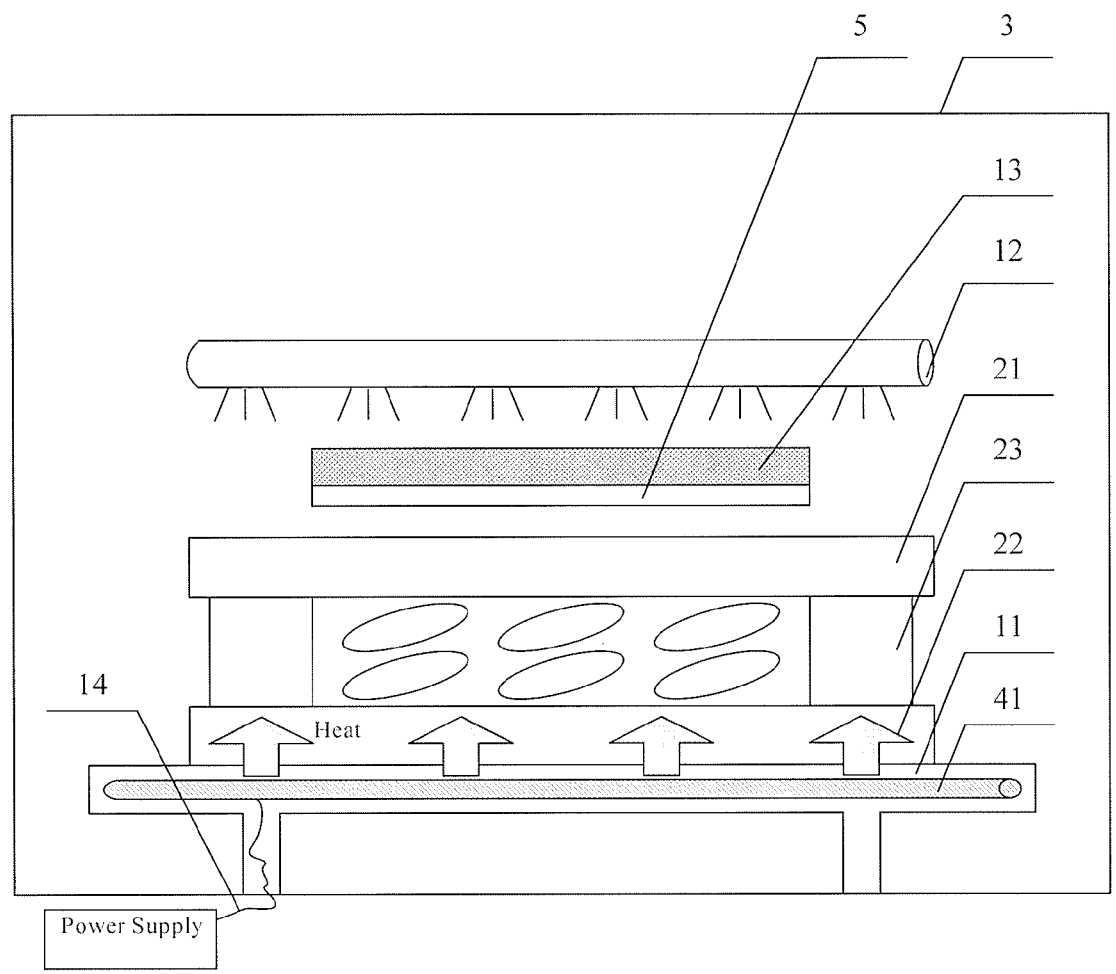
FIG. 6 is a schematic view of a curing device of a forth embodiment of the present invention.

FIG. 6 is a schematic view of a curing device of the forth embodiment of the present invention. As shown in FIG. 6, the curing device in this embodiment comprises the following parts.

A workbench 11 is provided for disposing a panel to be processed thereon and is located at the bottom of a reaction chamber 3. The workbench 11 is provided with a first area and a second area surrounded by the first area. The first area corresponds to the non-display area of the display panel to be produced, that is, the first area corresponds to the area where the adhesive material in the display panel to be produced is applied; the second area corresponds to the display area of the display panel to be produced. The workbench 11 is provided with a heating device.

An UV lamp 12 is provided for vertically irradiating the whole workbench 11 and is disposed at the top of the reaction chamber 3.

A light shielding plate 13 is provided for shielding the second area of the workbench 11 from the light from the UV lamp 12. That is, the light shielding plate 13 shields the display area of the display panel and is disposed under the UV lamp 12. Furthermore, the light shielding plate 13 is provided with an auxiliary heating device 5.

In this embodiment, the second area on the workbench 11 is heat-treated with the auxiliary heating device 5 on the light shielding plate to control the temperature of the first area and the second area.

In this embodiment, the auxiliary heating device 5 may be one of the heating devices used in the first to third embodiments. In addition, a plurality of air blowing holes may be provided uniformly under the light shielding plate 13 to accelerate the rate of transferring heat to the second area.

Furthermore, the heating device in this embodiment can be the same as any one in the first to third embodiments, so the description thereto is omitted.

Fifth Embodiment of Curing Device

Figure 7:
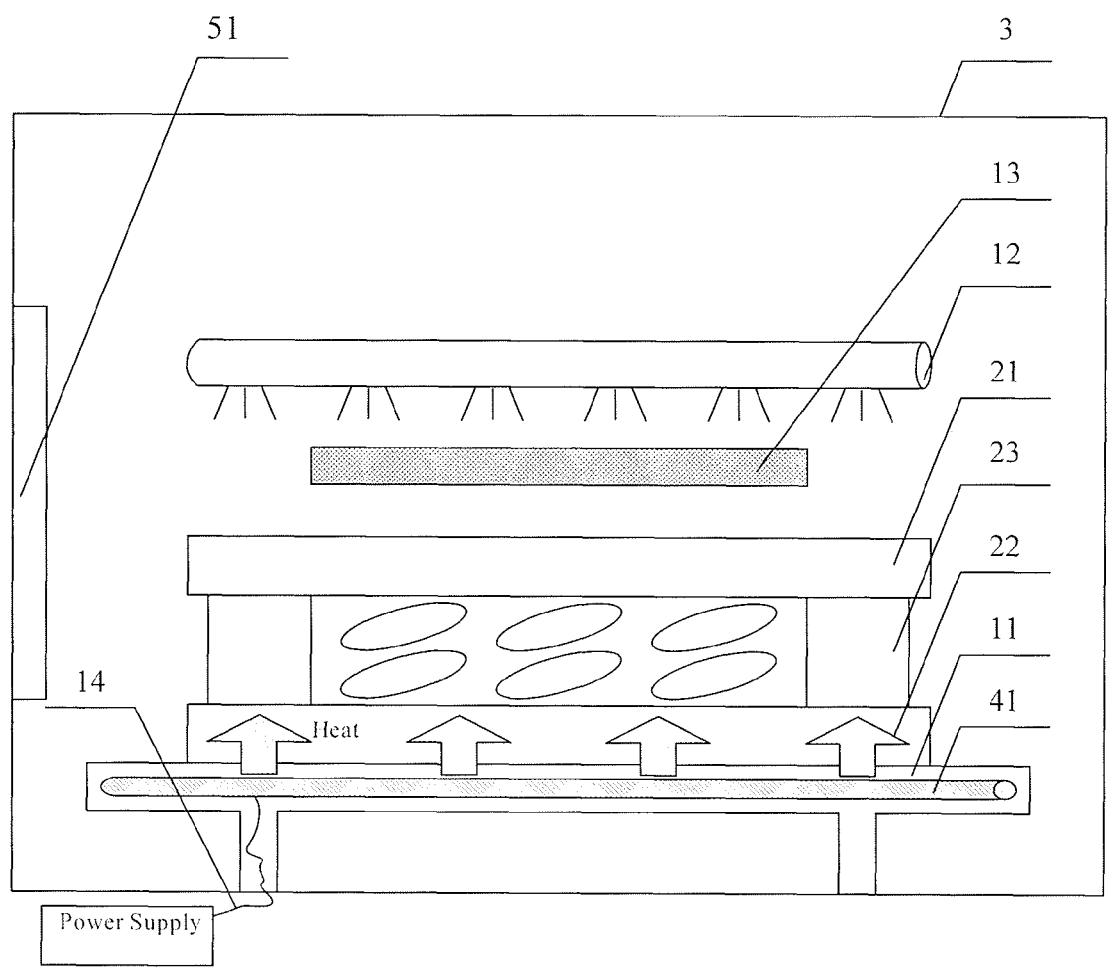
FIG. 7 is a schematic view of a curing device of a fifth embodiment of the present invention.

FIG. 7 is a schematic view of a curing device of the fifth embodiment of the present invention. As shown in FIG. 7, the curing device in this embodiment comprises the following parts.

A workbench 11 is provided for disposing a panel to be processed thereon and is located at the bottom of a reaction chamber 3. The workbench 11 is provided with a first area and a second area surrounded by the first area. The first area corresponds to the non-display area of the display panel, that is, the first area corresponds to the area where the adhesive material in the display panel is applied; the second area corresponds to the display area of the display panel. The workbench 11 is further provided with a heating device.

An UV lamp 12 is provided for vertically irradiating the whole workbench 11 and is disposed at the top of the reaction chamber 3.

A light shielding plate 13 is provided for shielding the second area of the workbench 11 from the light from the UV lamp 12. That is, the light shielding plate 13 shields the display area of the display panel and is disposed under the UV lamp 12.

An auxiliary heating device 51 is provided on the sidewall of the reaction chamber 3.

In the present embodiment, the auxiliary heating device 51 on the sidewall of the reaction chamber 3 is helpful to controls the temperature in the reaction chamber. Since the sidewall area of the reaction chamber is relative large, the auxiliary heating device 51 that is disposed uniformly on the sidewall of the reaction chamber can further speed up the rising of temperature and avoid the problem of local-overheating that may occur in the heating process.

In this embodiment, the auxiliary heating device may be any one of the heating devices in the first to forth embodiments, so the description thereto is omitted.

First Embodiment of Manufacturing Method

The manufacturing method of a LCD panel of the first embodiment uses one of the curing devices in the above described embodiments, and the method comprises the following steps.

Step 201, the liquid crystal materials are dropped on a plurality of panel areas of a prepared color filter substrate.

Step 202, the adhesive material is coated in a plurality of panel areas of a prepared array substrate. The adhesive material includes the components that react with UV ray and heat energy respectively. The material that reacts with UV ray is mainly cured upon applying UV ray, while the material that reacts with heat energy is mainly cured upon applying heat.

Step 203, the color filter substrata and an array substrate are assembled together in the vacuum anneal chamber to form an assembled panel.

Step 204, the adhesive material is cured and the liquid crystal materials are heated in one of the curing device in the above described embodiments, so that the liquid crystal maintains stable after realignment.

Step 205, the assembled panel is cut to form a plurality of LCD panels.

In the manufacturing method of the liquid crystal display panel in this embodiment, the UV curing and the heat treatment curing of the adhesive material are conducted at the same time in the same curing device, so that the stock room for storing the panel being UV cured is omitted in the manufacturing process of the LCD panel. In this way, the cost will not increase because a stock room is not used, especially when the size of the LCD panel becomes larger, and the manufacturing efficiency of the LCD panel is also effectively enhanced.

The embodiments of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A curing device comprising:
    a reaction chamber;
    a workbench provided at a bottom of the reaction chamber, wherein the workbench comprises a first area and a second area surrounded by the first area, the first area corresponds to a non-display area of a display panel to be produced, and the second area corresponds to the display area of the display panel to be produced;
    an ultraviolet lamp provided at the top of the reaction chamber for irradiating the workbench; and
    a light shielding plate provided under the ultraviolet lamp for shielding the second area of the workbench from the light of the ultraviolet lamp,
    wherein the workbench comprises a heating device.

2. The curing device as defined in claim 1, wherein the heating device comprises a conductive heating tube provided in the workbench, and the curing device further comprises a wire for connecting the conductive heating tube with a power supply.

3. The curing device as defined in claim 1, wherein the heating device comprises a vent line in the workbench, an air blowing hole for blowing hot air into the vent line, and an air outlet hole for exhausting the hot air in the vent line.

4. The curing device as defined in claim 1, wherein the workbench is a transparent workbench, and the heating device is an infrared lamp for irradiating the panel.

5. The curing device as defined in claim 1, wherein the light shielding plate is provided with an auxiliary heating device.

6. The curing device as defined in claim 5, wherein the auxiliary heating device is an infrared lamp provided under the light shielding plate for irritating the workbench.

7. The curing device as defined in claim 2, wherein the light shielding plate is provided with an auxiliary heating device.

8. The curing device as defined in claim 7, wherein the auxiliary heating device is an infrared lamp provided under the light shielding plate for irritating the workbench.

9. The curing device as defined in claim 3, wherein the light shielding plate is provided with an auxiliary heating device.

10. The curing device as defined in claim 9, wherein the auxiliary heating device is an infrared lamp provided under the light shielding plate for irritating the workbench.

11. The curing device as defined in claim 4, wherein the light shielding plate is provided with an auxiliary heating device.

12. The curing device as defined in claim 11, wherein the auxiliary heating device is an infrared lamp provided under the light shielding plate for irritating the workbench.

13. The curing device as defined in claim 1, wherein an auxiliary heating device is provided on a sidewall of the reaction chamber.

14. The curing device as defined in claim 2, wherein an auxiliary heating device is provided on a sidewall of the reaction chamber.

15. The curing device as defined in claim 3, wherein an auxiliary heating device is provided on a sidewall of the reaction chamber.

16. The curing device as defined in claim 4, wherein an auxiliary heating device is provided on a sidewall of the reaction chamber.

17. A method of manufacturing a liquid crystal display panel using the curing device as defined in claim 1, the method comprising steps of:
- dropping liquid crystal materials on a plurality of panel areas of a color filter substrate;
- coating an adhesive material in a plurality of panel areas of an array substrate;
- assembling the color filter substrata and the array substrate together in a vacuum curing chamber to form an assembled panel;
- curing the adhesive material and heating the liquid crystal materials by the curing device; and
- cutting the assembled panel to form a plurality of liquid crystal display panels.

* * * * *